Jan. 28, 1941.  W. W. LANDSIEDEL  2,229,980
COMPUTING MACHINE
Filed April 6, 1936  6 Sheets-Sheet 1
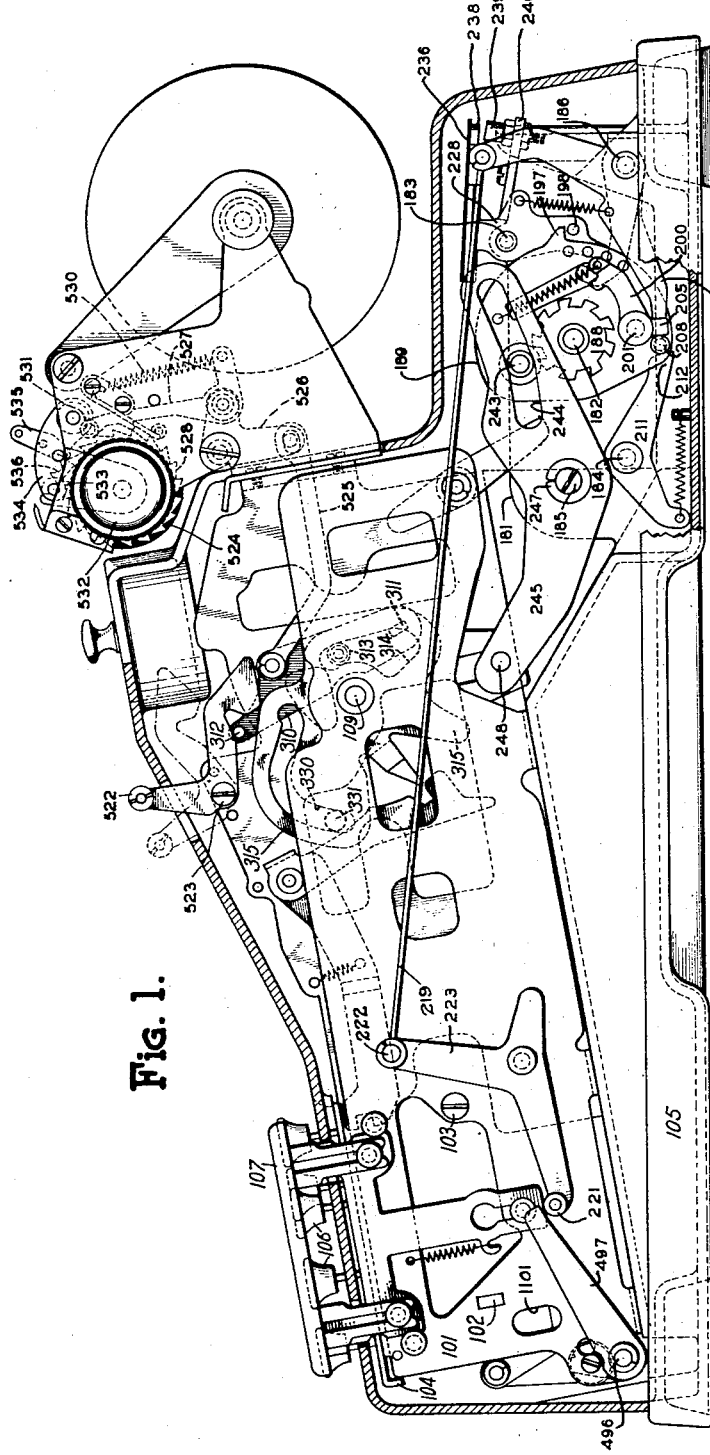
INVENTOR
WALTER W. LANDSIEDEL
BY
*W. A. Sparks*
ATTORNEY

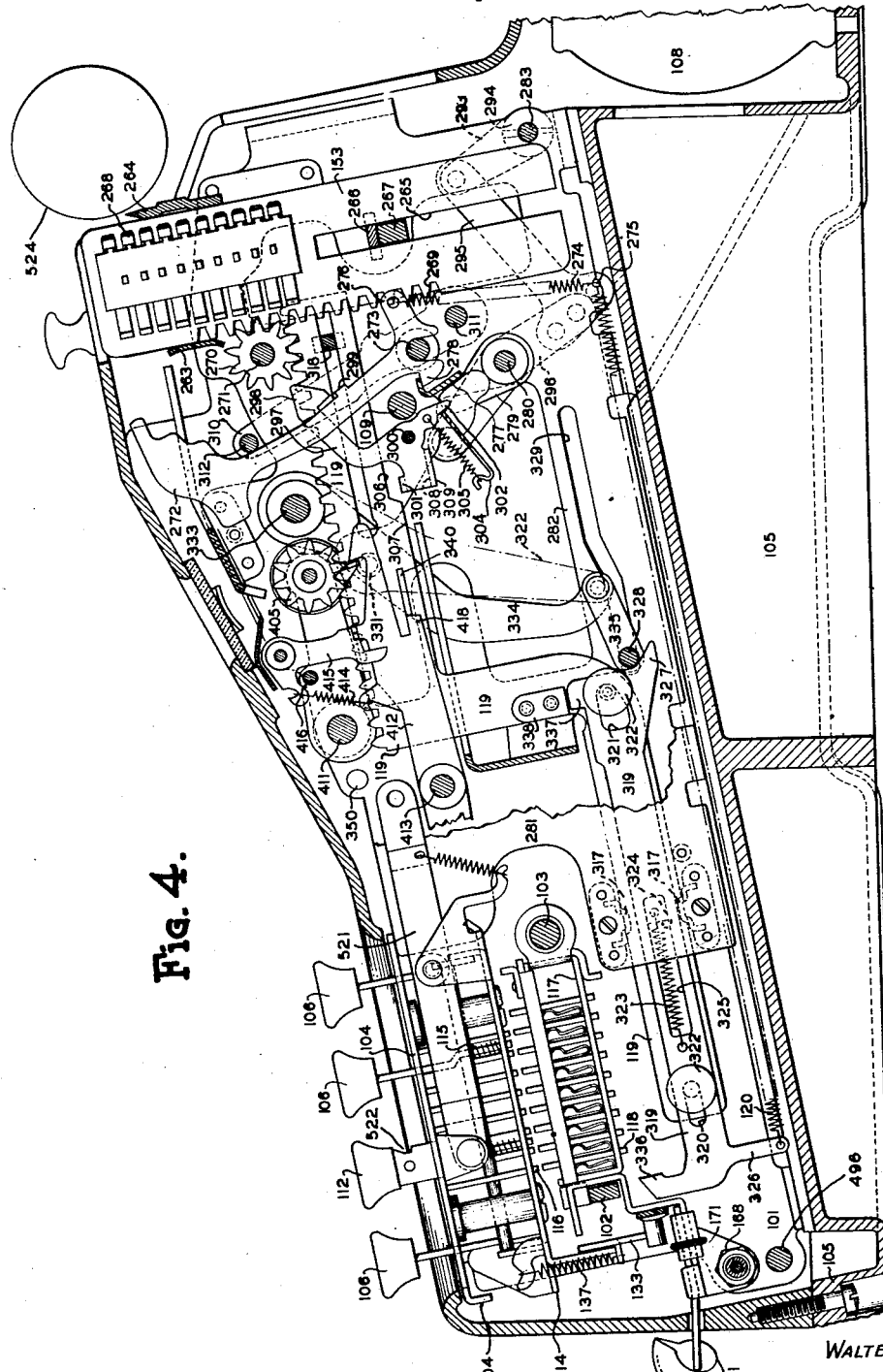

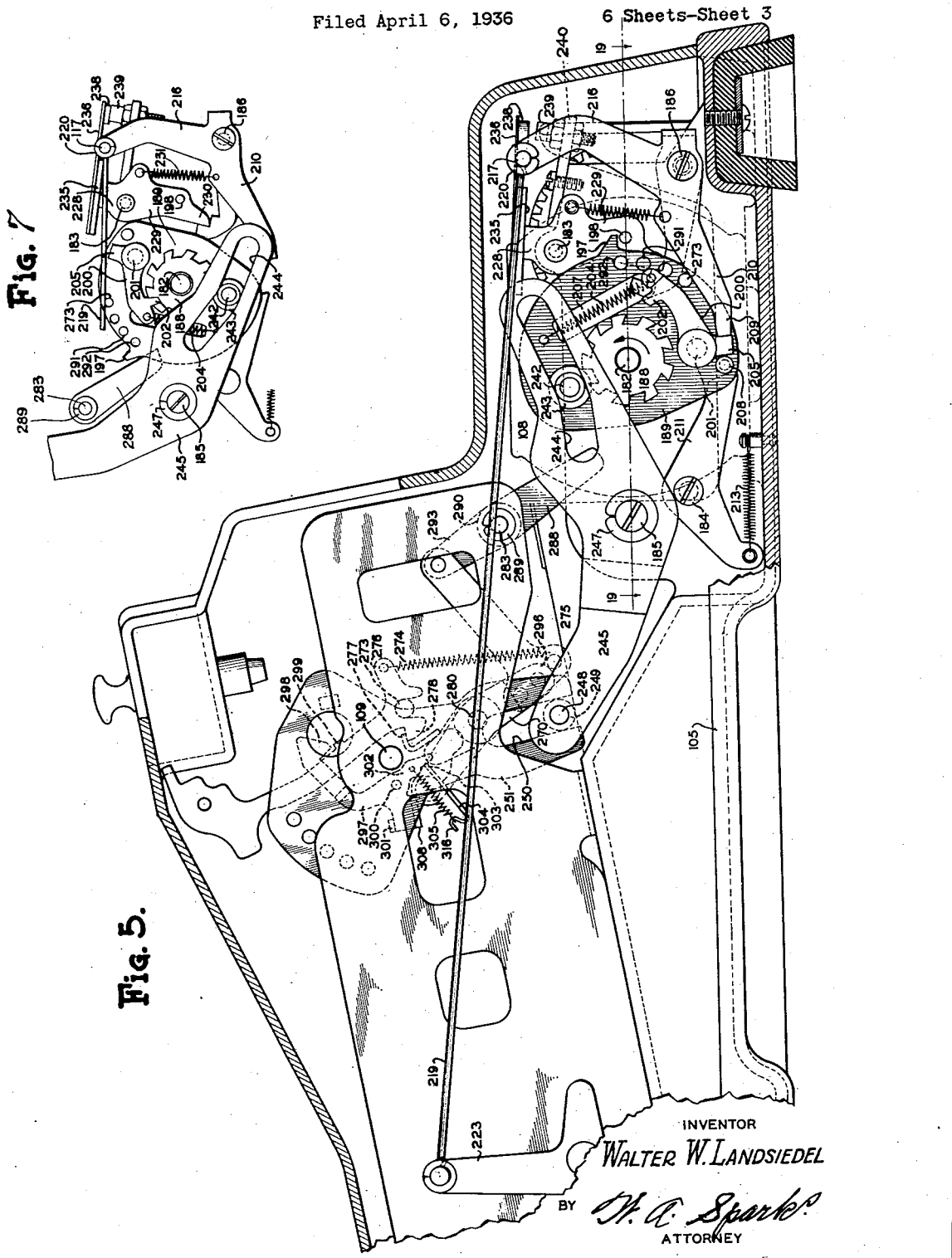

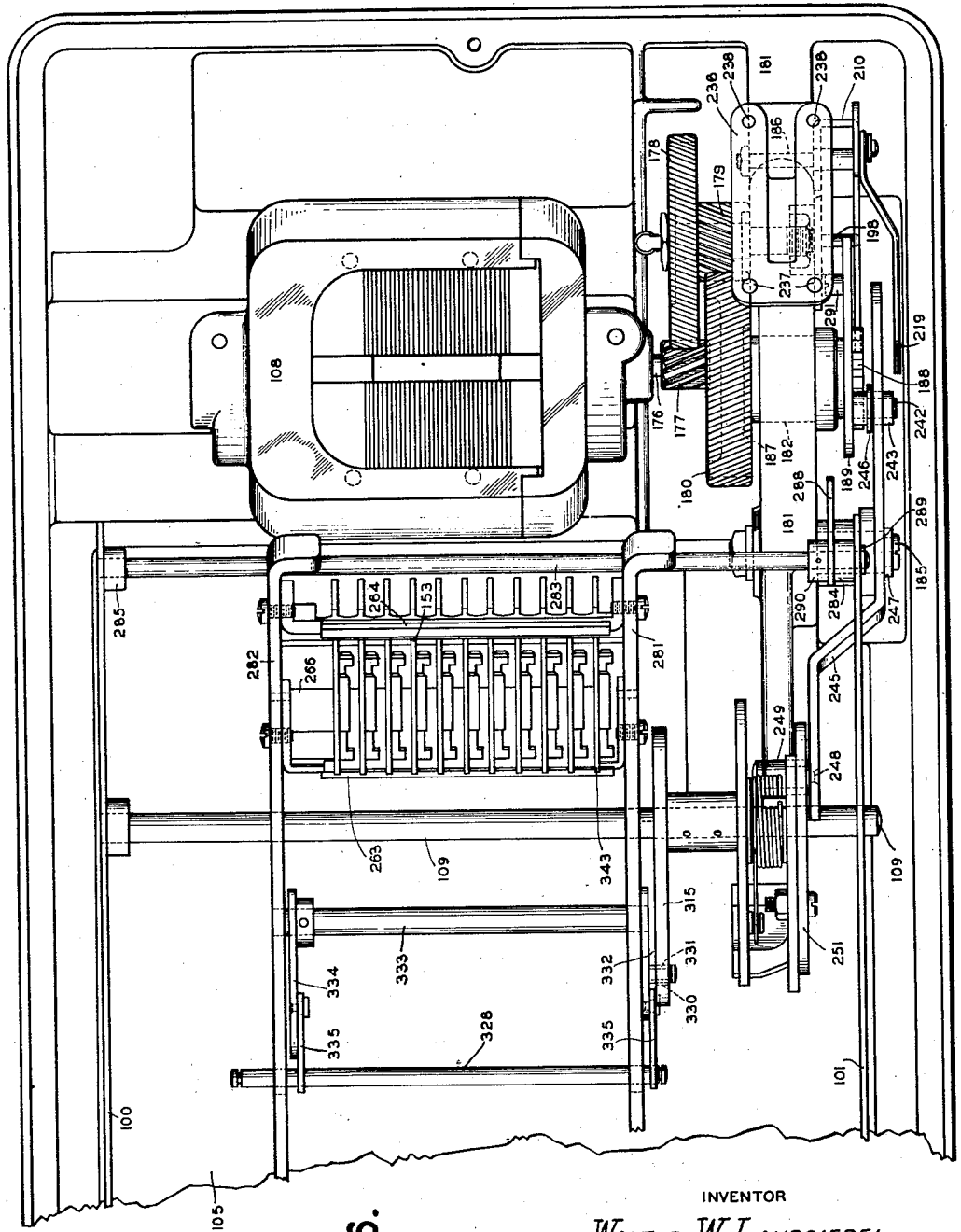

Jan. 28, 1941.　　W. W. LANDSIEDEL　　2,229,980
COMPUTING MACHINE
Filed April 6, 1936　　6 Sheets-Sheet 5
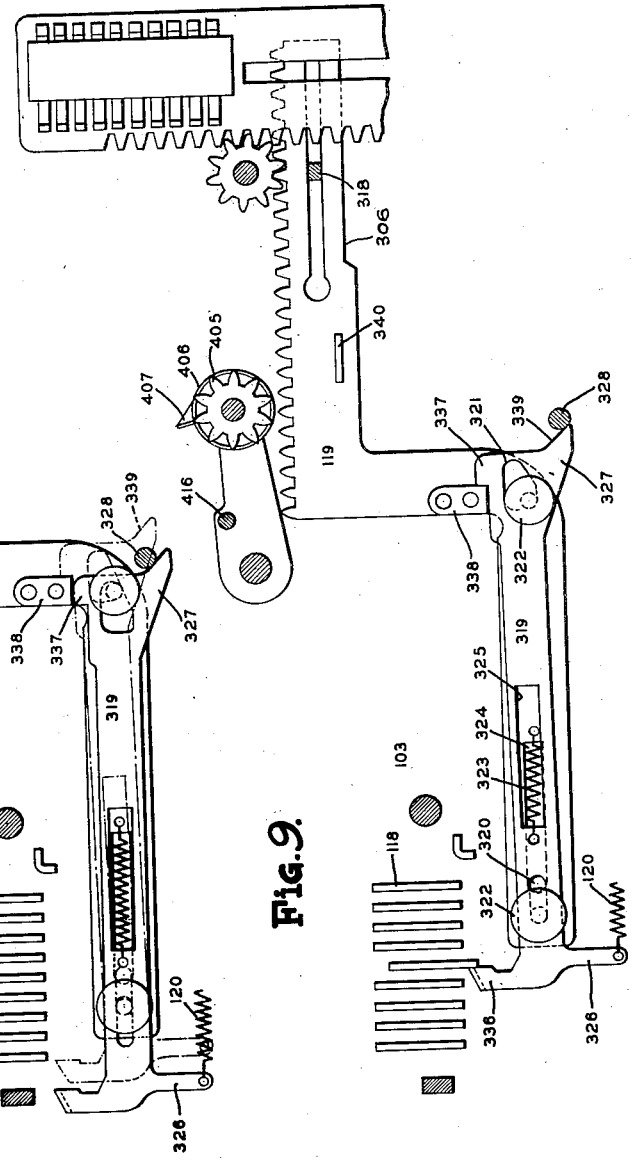
INVENTOR
WALTER W. LANDSIEDEL
BY
ATTORNEY Patented Jan. 28, 1941

2,229,980

UNITED STATES PATENT OFFICE 2,229,980

COMPUTING MACHINE

Walter W. Landsiedel, Norwood, Ohio, assignor to Remington Rand Inc., Buffalo, N. Y., a corporation of Delaware Application April 6, 1936, Serial No. 73,020

4 Claims. (Cl. 235—60)

My invention relates to computing machines, and it resides in certain improvements, features of construction and combinations and arrangements of parts, all of which will be fully set forth herein and particularly pointed out in the claims.

The immediate and specific object of the present invention was to improve the small portable and inexpensive ten-key adding and listing machine shown in patents to T. O. Mehan, Nos. 1,835,170, 1,876,719 and 1,899,444.

The particular object had in mind, in the present invention, was to incorporate into the machine a small operating motor and to adapt the mechanism of the machine to operation by such a motor at a much higher speed than that at which the machine had formerly been operated. In doing this, improvements were made which can be modified considerably from the specific form shown, and which are applicable to other machines. The basic idea behind most of these improvements was to increase the speed of operation while preserving and perhaps improving the qualities of reliability and certainty of operation. The drawings were made from a specific machine which, by holding down the motor bar, may be operated at a speed considerably above 140 cycles a minute and which machine is nevertheless small and light and inexpensive.

Among the other features incorporated in the present machine may be enumerated the following:

(1) The provision of an improved adding rack and carrying slide interlock.

(2) The provision of a new and improved motor drive mechanism.

(3) The provision of novel and effective non-print and non-line space mechanism, and of single and double line space mechanism for the platen.

My invention, therefore, has for its object to produce an improved computing and recording machine in respect of the matters above indicated, and of others which will be apparent from the following description.

In the accompanying drawings, wherein like reference characters represent corresponding parts in the various views:

Fig. 1 is a right-hand side elevation of the machine, the case of which is shown in vertical section, and with parts removed or shown in section or broken away.

Fig. 2 is a fragmentary right-hand side elevation showing the motor switch in closed position and associated parts in normal position.

Fig. 3 is a fragmentary right-hand side elevation similar to Fig. 2 but showing the motor drive crank, motor drive arm and associated parts as they will appear when half way through the return stroke of an operating cycle of the machine.

Fig. 4 is a front to rear vertical section through the machine with some parts omitted, other parts partially broken away and still others shown in elevation.

Fig. 5 is a partial right-hand elevation showing the delayed hammer firing mechanism and its relation with the motor drive mechanism, the case and part of the base appearing in vertical section.

Fig. 6 is a top or plan view of the rear or motor end of the machine with the case and other parts removed to clearly show the electric motor and some of the mechanism driven thereby.

Fig. 7 is a view similar to Figs. 2 and 3, but showing the parts at the end of the forward stroke.

Figs. 8 and 9 are detached diagrammatic views illustrating the adding rack and carrying slide interlock.

Figure 10:
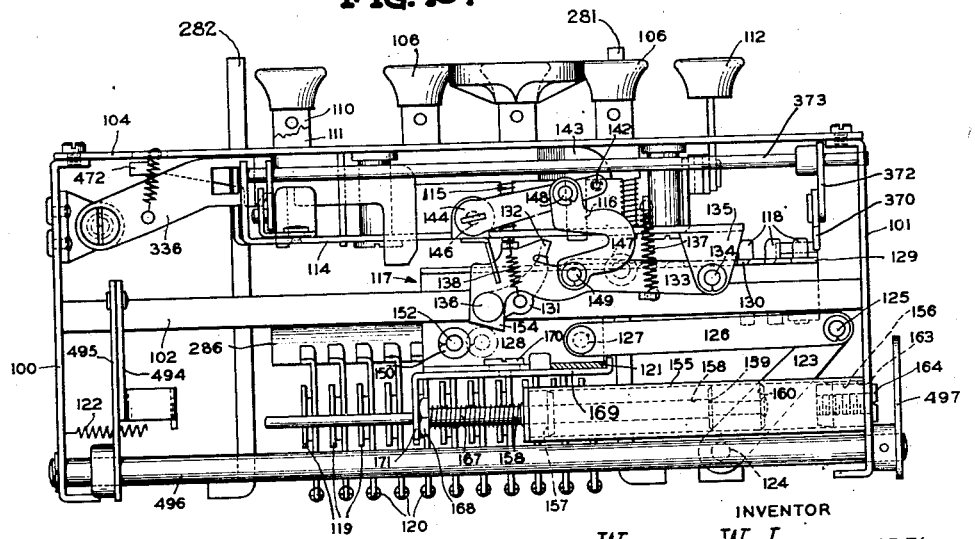
Fig. 10 is a front elevation of the machine with the cover and base plates removed.

In the accompanying drawings I have shown only so much of said machine as may be necessary to arrive at an understanding of my present invention in its embodiment therein.

From a consideration of Figs. 1, 4, 6 and 10, it will be seen that the frame of the machine by which the various working parts are supported comprises left and right outer frame plates 100 and 101, respectively, united by cross bars 102 and 103, by the upper key board plate 104 and by the base or bed plate 105; also, left and right inner frame plates 281, 282, between which the register and printing mechanisms are mounted.

The computing and printing operations determined by the set-up of the digit keys 106, are controlled in the present instance by the motor bar 107, Fig. 1, mounted at the right-hand side of the machine and which bar controls the electric motor 108 (Fig. 6) which drives the main rock shaft 109, though obviously said shaft may be hand driven by the usual handle carrying crank shown in Patent No. 1,899,444.

The digit keys 106 (Fig. 4) are arranged above the upper keyboard plate 104; the stem of each key passing through a guide slot in said plate. A reduced depending portion of each key stem passes through a guide slot in a lower keyboard plate 114 and is surrounded by a coiled expansion return spring 115 (Fig. 4). Each digit key stem also has an offset depending tappet portion 116 (Fig. 10) that projects downwardly through a guide opening in the plate 114, all of the tappets 116 being arranged in a single row fore and aft of the machine.

The pin carriage, which is designated as a whole by the reference numeral 117, (Fig. 4) is supported and guided on the cross bars 102 and 103 for movement transversely of the machine beneath the lower keyboard plate 114. This carriage carries rows of pins 118 (nine rows in the present instance) with nine pins in each row. Each of these pins is mounted in the carriage for limited vertical movement therein from an upper ineffective position as shown in Fig. 8 to a lower effective position, shown by #4 stop in Fig. 9. The parts are so constructed that each pin remains in either position to which it may be shifted until displaced therefrom, as is well known in the art. When the carriage is in its normal or initial right-hand position (Fig. 10) the left-hand fore and aft row of pins 118 is beneath the tappet portions 116 of the digit keys 106.

As the keys are depressed the carriage moves step-by-step from its initial right-hand position, and the fore and aft rows of pins 118 are brought successively into register with the row of depending tappet portions 116 of digit keys 106, each pin 118 of a row being directly beneath the corresponding tappet 116.

When the main shaft 109 is actuated, each depressed pin will arrest the rearward motion of corresponding adding rack 119 (spring impelled by its associated spring 120) in its proper position to determine the amount to be registered and recorded. On the return stroke of the machine, carriage 117 is automatically returned to the right (as viewed in Fig. 10) beyond its initial position, or to a position known as the "overthrow position," and eventually comes to rest in the normal position. The frame plate 101 has an opening 1101, Fig. 1, to allow parts 123 and 126 to move to the "overthrow position."

During the return movement of the carriage the lowered effective stop pins 118 are brought successively into contact with a fixed cam plate as disclosed in Patent No. 1,899,444 thus causing the pins to be restored upward to ineffective position on the pin carriage by a camming action. The return movement of the carriage may also be effected at any time with like effect by the aid of the usual correction key 121, as pointed out in Patent No. 1,876,719.

The step-by-step feed movement of the pin carriage is controlled in the same manner as disclosed in the above mentioned Patent No. 1,899,444 but will be explained again in detail in order to fully disclose the action, operation, and advantages of the digit key pin carriage overthrow lock. Power is exerted to move the carriage from the right to left by a spring 122 (Fig. 10) anchored at one end, to the left side frame plate 100, and connected at its opposite end to an arm 123, as shown in Patent No. 1,899,444. Said arm is fast at its lower end on a rock shaft 124, journaled in a bracket on the base 105, the upper end of the arm being pivoted at 125 to one end of a link 126, the opposite end of which is pivoted at 127 to a bracket 128 formed integral with feed rack 129.

Motor drive

Referring now to the motor drive and especially to Figs. 1, 2, 3, 5 and 6, the small electric motor 108 is secured to the base 105 and drives a ratchet disk 188, (which is an element of a one-revolution clutch) through speed-reduction gearing consisting of a pinion 177 (Fig. 6) on the armature shaft 176, which meshes with a gear 178 fast with a pinion 179, which latter meshes with a gear 180 fast on the shaft 182 on which said ratchet 188 is secured. The driven member of said clutch consists of a drive crank or disk 189 (Fig. 5) carrying a clutch pawl 200 adapted for engagement with and disengagement from the ratchet 188. Said disk carries a stud or wrist pin 242 and roller 243 playing in a slot 244 in a two-armed drive lever 245 which in turn carries a stud 248 and roller 249 (Fig. 5) playing in a radial slot 250 in an arm 251 on the main shaft 109. The construction is such that each rotation of disk 189 imparts to said main shaft a complete oscillation consisting of a forward and a return stroke. The base 105 has integral therewith an upright wall 181 which serves to support the ratchet shaft 182 and various control devices.

As clearly shown in Fig. 5, clutch pawl 200 is pivotally mounted on the outer face of drive crank 189 at 201, and has a finger 202 for engagement with the ratchet 188. A spring 204 lying in an opening 207 in crank 189, urges the finger 202 towards the ratchet 188. When the drive crank 189 is in the normal position as shown in Fig. 5 a short arm 205 of the clutch pawl 200 is held between a pin 208 carried on the outer face of crank 189, and the tip 209 of a control arm 210, thus holding the finger 202 disengaged from ratchet 188, and holding crank disk 189 against counter-clockwise rotation.

Clockwise movement of the drive crank 189 due to the reaction of spring 204 for the lock pawl 200 is prevented by back stop 211 which is like a pawl pivoted at 184 to the wall 181 and controlled by a spring 213. The pin 208 extends through and projects leftward from the disk 189, where it is engaged by the end of the stop pawl 211. Control arm 210 is bail-shaped and each of the arms of the bail pivots upon a stud 186 mounted on the outer side of wall 181. The control arm 210 has an upwardly projecting arm 216 supplied with a keeper stud 217 on which the eye of a wire link 219 is pivoted and is retained thereon by keeper 220. The other end of link 219 terminates in an eye which is pivoted on a keeper-stud 222, carried by the upper end of a control bell crank 223, an arm of which carries a roll 221 underlying the stem of the motor bar or key 107. The control lever 210 is drawn upward by a spring 231. The construction is such that if said lever be tripped momentarily as by depressing the motor bar 107, the clutch pawl 200 will be drawn into engagement as shown in Fig. 2, and, if ratchet 188 is rotating, crank disk 189 will revolve (Fig. 3), trip lever 210 will return to normal position and at the end of one rotation of disk 189, said lever will be struck by arm 205, forcing pawl 200 out of engagement, and arresting the rotation of crank disk 189. The stop pawl 211 will snap into engagement with the stud 208 and hold the crank disk against backward turning.

The motor may, if desired, be controlled by a hand switch and be allowed to run continuously while the machine is in use, but it is preferable to have the motor energized only during each cycle of operation, its circuit being closed automatically when the control lever 210 is tripped, and broken just before the crank disk 189 completes its rotation. To this end the motor circuit includes two fixed contacts 239 (Figs. 1, 2, 3 and 5) mounted on an insulating support 240 secured to the top of the base wall 181, and means are provided to connect these two contacts with a conductor 236 at the proper times. This conductor has the U-shape shown in Fig. 6 and it carries on its elastic arms two contacts 238 for cooperation with contacts 239.

The conductor 236 is riveted at 237 to a piece of insulating material 235 which is secured to the horizontal cross bar of a bail-shaped contact arm 228 which straddles wall 181, and is pivotally mounted upon a stud or short shaft 183. The structure is urged clockwise in the drawings by the spring 231, the upper end of which is connected to the outer branch 229 of said contact arm. The control arm 210 is the right-hand branch of a bail, the left-hand branch of which is an arm 225 having at its end two stepped shoulders 226 and 227 (Fig. 3). The arm 229 terminates in a tail 230 which is normally pressed by spring 231 against the lower step or shoulder 226, which thus holds the contacts 238 away from contacts 239, as best shown in Fig. 1.

When the control arm 210 is tripped as shown in Fig. 2, arm 225 is swung downward, tail 230 escapes from step 226, swings forward and limits on step 227, as best shown in Fig. 7. This clockwise rotation of the contact arm closes the motor circuit at 238, 239 and starts the motor.

In order to break the motor circuit positively, the crank disk 189 has a projecting cam nose 197 which, just before the completion of a rotation of said disk, strikes a stud 198 on the arm 229 and forces said arm toward the rear of the machine, raising the contacts 238. Up to this time the tail 230 resting on top of step 226, had held the control arm 210 depressed, as shown in Fig. 3. The counter-clockwise swinging of arm 229 releases control arm 210 which, unless the lever 223 is held in operated position, instantly snaps into the path of arm 205 of pawl 200 and stops the crank disk 229 as above described. If the control arm 210 is held out by any means, the machine will execute a succession of cycles. The motor circuit will be broken at the end of each cycle as just described, but the contact arm will immediately swing back to circuit-closing position and the motor will not stop.

The type bars 153 (Fig. 4) are guided for vertical sliding movement by upper fixed combs 263 and 264. Below said comb plates the type bars are vertically slotted at 265 to fit in notches formed in a fixed plate 266 and over a fixed bar 267. The type 268 may be slidably secured to the bars 153 in any suitable manner as is well known in the art. Racks 269 on the front edges of the type bars 153 are in mesh with pinions 270 which are freely mounted in suitable spaced relation on a fixed shaft 271. The pinions 270 are also in mesh with adding racks 119 and thus transmit the differential motion of the adding racks to the type bars.

The type hammers 272 are freely pivoted on a shaft 273 and urged to type striking position by means of springs 274 which at one end are anchored to the rod 275 and at the other end secured to the rearwardly projecting ears 276 integral with the hammers. The hammers 272 are normally held in their forward position by the engagement of a sear 277 over their toes 278. The ends of the sear 277 terminate in a pair of oppositely disposed bail arms 279 which are fixed to the shaft 280 just inside the center frame plates 281 and 282 respectively.

There are some matters of timing that are worthy of note. It is desired to keep the machine as small, light and portable as may be, and it is, therefore, for that and other reasons desirable to use a small motor. The load on the motor varies considerably in different parts of the cycle and the connections are so designed as to give the motor a higher leverage on the mechanism at the times of high load than at the times of low load. There is but little load on the motor during the forward stroke of the shaft 109.

It will be noted that the slot 244 (Figs. 1 and 5) in the lever 245 is as to its outer portion about radial of the lever arm and when the machine is standing in its normal position shown in Fig. 1, the roll 243 is in that portion of the slot which is tangent to the orbit of the said roll. The construction is such that the extreme swinging motion of the lever 245 is from the point where this radial slot is tangent to the orbit of the roll 243, as shown in Fig. 1, to the point where this same line is tangent to said orbit in its lower position, as shown in Fig. 7. It will be perceived that this is about 120° of the rotation of the disk 189. During this period, the roll is moving in the part of the slot 244 nearest the pivotal center 185, and is, therefore, rocking the lever 245 much more rapidly than during the remaining two-thirds of the rotation of said roll, at which time the roll is in the outer portion of the slot and has a longer leverage on the lever 245. It is during this period that the heavy work is encountered by the motor in restoring the parts and stretching the springs of the differential slides.

Not only is the inner end of the slot 244 nearer to the pivot 185, but this end of the slot is also inclined upward out of the radial, so that as the roll 243 moves through about its first 60°, it swings the lever 245 through more than half of the full motion of that lever. In the next 60° of rotation, the roll is running down the incline of the slot and the lever 245, therefore, moves less rapidly. It is during this time that the roll 331, which controls the differential slides is moving in the inclined part of its cammed groove and drawing the restoring bar 328 toward the rear of the machine.

When the roll 243 reaches the position shown in Fig. 7, which is the end of the forward stroke of the operating shaft 109, the roll is substantially in the curved part of the slot 244 where the two inclined branches of said slot meet. There is at this point, therefore, a period of somewhere near 30° of rotation of the disk 189, where there is almost no motion at all of the lever 245 and the shaft 109. It is at this period that the adding racks and type bars have been arrested by their stops and this pause in the operation of the machine gives them a moment in which to quiet down any vibration into which they may have been set by the arrest of their motion.

*Adding rack and carrying slide interlock*

A plurality of adding racks 119, (nine in the present machine) are mounted for longitudinal sliding movement, being guided at their lower horizontal portions by a pair of opposed combs 317 (Fig. 4) and at their upper horizontal portions by a square rod 318 supported by the center frame plates 281 and 282. The rod 318 is provided with opposed spaced apart slots to receive the adding racks and thus maintain them in suitable spaced relation.

A carry slide 319 (as best shown in Figs. 8 and 9) having slots 320 and 321, is slidably secured to each adding rack 119 by a pair of shoulder rivets 322 which extend freely through the slots 320, 321, and are fixed in the adding racks. A spring 323 (received by the openings 324, 325 in the adding rack 119 and carry slide 319 respectively) has one end secured to the slide 319 and its other end secured to the adding rack 119 as clearly shown in Figs. 4, 8 and 9. This spring tends to move the slide 319 to its rearward position on the adding rack 119, which effect is utilized in transferring operations in a manner soon to be described. As before mentioned a tensil spring 120 has one end secured to a depending toe 326 at the forward end of the slide 319 and has its other end anchored to a fixed rod 275 at the rear of the machine. This spring tends to move the slide and its associated adding rack rearwardly as a unit. The slide 319 is normally restrained from such rearward movement by the engagement of its rearward toe 327 with the restoring rod 328, the ends of which slide in the slots 329—329 in the center frame plates 281 and 282.

In order to reciprocate the restoring rod 328, a shaft 333 (Figs. 4 and 6) journaled in the frame plates 281 and 282, has fast thereon a right-hand arm 332 just outside plate 281 and a left-hand arm 334 just inside of plate 282. Upon the forward stroke or counter-clockwise movement of main shaft 109 as viewed from the right-hand side of the machine the cam plate 315 fast on said shaft is rotated counter-clockwise and through engagement of its slot 330 with a roller 331 carried by the right arm 332 (see Figs. 1, 4 and 6) rocks shaft 333 and its two arms counter-clockwise also. Links 335—335 connect the lower ends of arms 332, 334 with the restoring rod 328. It will therefore be seen that upon the forward stroke of the machine the restoring rod 328 will be moved rearwardly and carry-slides 319 will be free to follow, being moved by their tension springs 120 until the projections 336 strike the pins 118 (as best shown in Figs. 4, 8 and 9) which have been previously depressed by the actuation of the digit keys 106, and upon the return stroke of the main shaft the rod 328 will restore the racks to initial positions.

In order to adapt the mechanism to a higher speed than hand operation, certain changes from former constructions have been made in the carry-slide 319 and its connection with the rack bar 119. In the stop carriage 117, at the left of the series of stops 118, there is in this machine the usual flap or stop bar 286 (Fig. 10) having its forward edge in alignment with the zero stops 118, this device having for its function to hold against movement all of those rack bars 119 at the left of the highest digit being added. In the machine heretofore the lug which was arrested by this stop bar and by the stops 118 consisted of an upwardly projecting finger integral with the bar 119. When the parts were restored to normal position, these fingers lay immediately in front of the zero stops, or rather, of the flap 286 above referred to. The restoring bar 328 does not act on the bars 119 directly, but acts on the slides 319 which are connected with the bars 119 by the springs 323. It was found that in very rapid operation by a motor, the bar 119 might lag behind the slide 319 in its restoring motion. In the last part of the return stroke of the mechanism, the carriage 117 is restored to the right, and it was found possible that in rapid operation a bar 119 lagging behind its slide 319 might fail to get its stop finger out of the way of the stop flap 286 on the carriage and there would be a collision of the parts. To prevent this in the present construction, the stop finger has been removed from the bar 119 and now consists of a finger 336 projecting upward from the front end of the slide 319, and having an ear formed over to cooperate with the stops 118. Not only is this finger positively restored by the bar 328, but in its normal position it stands some distance in front of the stop flap so that there is no danger of interference such as above described.

Arresting the parts by a lug on the slide 319 introduced the possibility of another trouble, viz., that of the overthrow of the bar 119, stretching the spring 323, when the slide 319 was arrested. To provide for this the parts have been modified so as to lock the bar 119 and slide 319 together on their rearward movement. The rear end of said slide 319 is extended upward to make a heel 337, which, as shown in Fig. 8, normally lies beneath a plate or lamination 338 secured to the side of the bar 119 and the slot 321 has been widened at its front end to allow this heel to move up behind said lamination when the slide 319 moves rearward on the bar 119 as shown in Fig. 9. The spring 323 tends to pull the bar 119 toward the front of the machine so that, when the restoring bar 328 first moves rearward, the slide 319 follows it independently of the bar 119 until the front end of the slot 320 strikes the shouldered rivet 322. The spring 120 being below said rivet then turns the slide 319 upward at its rear end bringing about the locking engagement referred to, with the result that, when the ear 336 is arrested, the bar 119 cannot overthrow.

In order to restore the parts to their normal relative positions, the rear end of the slide 319 is extended into a toe or finger 327, the upper edge of which is inclined and is contacted by the restoring bar 328 which thus cams the rear end of the slide 319 down out of engagement with the lamination 338.

The particular point in the operation at which the overthrow of the rack 119 would be most harmful is that at which the slide is arrested by one of the higher stops such as 7, 8 or 9, and especially the last. When the rack 119 is arrested at that position in an adding operation, the register wheels are very soon thereafter depressed into engagement with the racks, and it is essential that the racks be accurately positioned, and that there be no overthrow, stretching the springs 323 at that time. In the case of smaller numbers the vibration of the racks would have time to quiet down before the register wheels were engaged. In order to restore the slide 319, it is necessary that the bar 328 contact the inclined toe 327, but such contact may have some tendency to prevent the upward movement of the heel 337. For this reason the guide slots 329 for the bar 328 are made in two levels connected by an incline as shown in Fig. 4, the forward portion of each slot being at the lower level to insure the disengagement of the heel 337, and the rear portion of each slot being at the higher level in order that the bar 328 shall engage not the inclined toe 327 but the vertical rear edge of the slide at the time when the parts are arrested by one of the stops of higher value.

The line space mechanism for turning the platen 524 (Fig. 1) is operated from the printing hammer restoring bail and, therefore, does not operate when the non-print key is in use. The right-hand arm 310 of this bail has pivoted thereto a link 525 which at its rear end has lost motion pivotal connection with a bell crank 526, the horizontal arm of which has pivoted thereto the line space pawl 527, which acts on the ratchet 528 against which it is pressed by a spring 530. The construction is such that when the bar 312 moves toward the rear in the forward stroke of the operating shaft, the pawl 527 moves upward to take hold of a new tooth of the ratchet, and it moves downward to space the paper on the return stroke following the printing. On the down stroke of the pawl 527, a stud or roll 531 on the end of the pawl engages a tooth of the ratchet and cams the pawl out of engagement with the ratchet so as to leave the platen free to be turned in either direction by a finger wheel 532. The platen is retained by a detent comprising a roll 533 mounted on a spring-pressed lever 534 and engaging the ratchet wheel teeth.

In order to provide for single and double spacing, an arm 535 is pivoted on the axle of the platen and has two notches 536 for engagement by the axle of the roll 533. The construction is such that this lever can be set to either of two positions, where it will be retained by said notches. When set in the rear position shown in Fig. 1, the stud 531 on the pawl 527 will, on the upstroke of said pawl, rub against the rear edge of this lever and hold the pawl out from one of the teeth of the ratchet, so that on the down stroke, the ratchet will be turned only one tooth. With this lever in its forward position, the pawl will not be so deflected, and it will engage a higher tooth, so that, on its down stroke, it will turn the platen two teeth of the ratchet.

Various changes may be made in the details of construction and arrangement without departing from my invention.

Having thus described my invention, what I claim as new and desire to secure by Letters Patent is:

1. In an adding machine, the combination of a register wheel, a reciprocating rack for actuating said register wheel on its return movement, a differential member connected to said rack for relative sliding and rocking motion, means on said member and rack for locking together said member and rack, and means acting during the initial movement of said member to cause first a sliding movement of said member relative to said rack, and then a rocking movement of said member into locking engagement with said rack.

2. In an adding machine, the combination of a register wheel, a reciprocatory rack for actuating said wheel, a differential member having a lost motion connection with said rack and movable relatively to said rack for preventing overthrow of said rack, stops for arresting said differential member, a restoring bar for said differential member, and means for guiding said restoring bar to effect movement of said differential member from overthrow-preventing position to normal rest position.

3. In an adding machine, the combination of a register wheel, a reciprocatory rack for actuating said wheel, a locking element on said rack, a differential member having a locking element and having a lost motion connection with said rack, and means for first moving said differential member for taking up the lost motion between it and said rack and for effecting movement of one of said locking elements into locking relation with the other of said locking elements during the initial movement of said differential member.

4. In an adding machine, the combination of a register wheel, a reciprocatory rack for actuating said wheel, a locking element on said rack, a differential member having a locking element and having a lost motion connection with said rack, means for first moving said differential member for taking up the lost motion between it and said rack and for effecting movement of one of said locking elements into locking relation with the other of said locking elements during the initial movement of said differential member, and a rod for returning said rack and member to normal and concomitantly effecting unlocking of said locking elements.

WALTER W. LANDSIEDEL.